(12) United States Patent
Enomoto et al.

(10) Patent No.: US 8,069,892 B2
(45) Date of Patent: Dec. 6, 2011

(54) FILM BONDING MACHINE

(75) Inventors: Akio Enomoto, Chita-gun (JP); Tomoko Ota, Seto (JP)

(73) Assignee: NGK Insulators, Ltd., Nagoya (JP)

( * ) Notice: Subject to any disclaimer, the term of this patent is extended or adjusted under 35 U.S.C. 154(b) by 876 days.

(21) Appl. No.: 10/591,296

(22) PCT Filed: Mar. 11, 2005

(86) PCT No.: PCT/JP2005/004373
§ 371 (c)(1),
(2), (4) Date: Aug. 31, 2006

(87) PCT Pub. No.: WO2005/087425
PCT Pub. Date: Sep. 22, 2005

(65) Prior Publication Data
US 2007/0169894 A1    Jul. 26, 2007

(30) Foreign Application Priority Data
Mar. 12, 2004   (JP) .................. 2004-071139

(51) Int. Cl.
*B65C 9/00* (2006.01)
(52) U.S. Cl. .......... 156/379; 156/64; 156/350; 156/353; 156/378; 156/379.6; 156/380.7; 156/269; 156/273.7; 156/275.1; 156/522; 156/908; 264/40.1; 264/400; 264/267; 264/154; 264/273; 264/629; 264/482; 83/76.4
(58) Field of Classification Search .................. 156/379, 156/379.6, 380.7, 269, 273.7, 275.1, 522, 156/908, 64, 350, 353, 378; 264/400, 40.1, 264/267, 154, 250, 273, 629, 482; 83/76.4
See application file for complete search history.

(56) References Cited

U.S. PATENT DOCUMENTS

| 4,557,773 | A | 12/1985 | Bonzo |
| 6,811,737 | B2 * | 11/2004 | Fukuta et al. ............. 264/482 |
| 2002/0020944 | A1 | 2/2002 | Yamaguchi et al. |

FOREIGN PATENT DOCUMENTS

| JP | B2-61-51240 | 11/1986 |
| JP | A-01-233083 | 9/1989 |
| JP | A-5-115991 | 5/1993 |
| JP | A-09-057479 | 3/1997 |
| JP | A-9-85481 | 3/1997 |
| JP | A-2002-028915 | 1/2002 |
| JP | A-2002-126421 | 5/2002 |

* cited by examiner

*Primary Examiner* — Katarzyna Wyrozebski Lee
*Assistant Examiner* — Joshel Rivera
(74) *Attorney, Agent, or Firm* — Oliff & Berridge, PLC

(57) ABSTRACT

In a film bonding machine 1 including a laser oscillation means 2 for oscillating laser for processing a tape 7 bonded onto an end surface 8 of a columnar honeycomb structural body 6 by the laser oscillated from the laser oscillation means 2, the film bonding machine 1 further includes an image pick-up means 3 having a moving type or tilt type mirror 4 capable of reflecting the end surface 8 of the honeycomb structural body 6 onto the same axis as the laser oscillation means 2 by reflected light and an image pick-up unit 5 for picking up the image of the end surface 8 of the honeycomb structural body 6 reflected by the mirror 4. In the film bonding machine 1, the processing position of the tape 7 bonded onto the end surface 8 of the honeycomb structural body 6 can be recognized by the image-pick means 3 on the same axis as the laser oscillation means 2. As a result, the tape bonded onto the end surface of the honeycomb structural body can be accurately processed by the laser.

11 Claims, 3 Drawing Sheets

FILM BONDING MACHINE

TECHNICAL FIELD

The present invention relates to a film bonding machine. More particularly, the present invention relates to a film bonding machine that can process a tape bonded onto an end surface of a honeycomb structural body by laser with pinpoint accuracy.

BACKGROUND ART

There is an increased necessity to remove fine particles and harmful substances contained in exhaust gases from boilers and the like in consideration of the adverse effect of them to the environment. In particular, regulations as to removal of fine particles (hereinafter, also called PM) exhausted from diesel engines tend to be made more strict in Europe and the United States as well as in Japan, and a honeycomb structural body is used as a collecting filter (hereinafter, also called DPF) to remove the PM.

In general, as shown in FIGS. 3(a) and 3(b), the honeycomb structural body used as the collecting filter and the like has such a structure that it includes a plurality of cells 23, which are partitioned by a porous partition wall 24 and act as fluid flow paths, and adjacent cells 23 are plugged at one ends opposite to each other so that the end surfaces of the cells 23 exhibit a checkered pattern. In the honeycomb structural body 21 having the above structure, a fluid to be treated flows into a cell 23 whose flow-in-hole side end surface 25 is not plugged, that is, a cell 23 whose end portion is plugged on a flow-out-hole side end surface 26 and is exhausted from an adjacent cell 23, that is, from the cell 23 whose end portion is plugged on the flow-in-hole side end surface 25 and whose flow-out-hole side end surface 26 is not plugged passing through the porous partition wall 24. At the time, the partition wall 24 acts as a filter, and when the honeycomb structural body is used as the DPF, soot and the like exhausted from diesel engines is trapped by the partition wall 24 and deposited on it.

The honeycomb structural body 21 used as described above has a problem in that a temperature is unevenly distributed in the honeycomb structural body 21 due to the arbitrary change of temperature of an exhaust gas and local heat generation and thus cracks and the like are made in the honeycomb structural body 21. In particular, when the honeycomb structural body 21 is used as the DPF, it must be regenerated by burning off accumulated carbon fine particles. At the time, the honeycomb structural body 21 is locally heated to a high temperature unevenly, from which a problem arises in that a regenerating efficiency is lowered and clacks are liable to be made due to a large amount of thermal stress.

To cope with the above problems, there are disclosed methods of joining segment-like honeycomb structural bodies (segments) obtained by dividing a honeycomb structural body by a joint material (refer to, for example, Patent Document 1).

When the segment-like honeycomb structural bodies are joined to each other by the joint material, the end surfaces of the respective honeycomb structural bodies are protected by a resin tape bonded onto them to prevent an extra joint material from protruding and entering into the openings of cells formed to the respective honeycomb structural bodies. Further, when silicon carbide (SiC) having a small coefficient of thermal expansion is used as the material of the honeycomb structural body, a manufacturing method of joining segment-like honeycomb structural bodies is also used.

Patent Document 1: Japanese Patent Publication No. 61-51240

DISCLOSURE OF THE INVENTION

However, in a job for bonding a tape onto the end surface of the honeycomb structural bodiesince the size and the like of the end surfaces of the honeycomb structural bodies formed in the segment shape are dispersed, a tape (for example, a band-shaped tape) larger than the area of the end surface is bonded onto the end surface of the segment, and the extra portion of the tape is cut off by hand. Accordingly, there is a problem in that a process is complex and a resultant honeycomb structural body is expensive. Further, there is also a problem in that, in the tape bonded onto the end surface of the honeycomb structural body, the ratio of the amount of a tape, which is cut off as an extra portion and discarded, is large as compared with the amount of a substantially used tape.

An object of the present invention, which was made in view of the above problems, is to provide a film bonding machine that can process a tape bonded onto the end surface of a honeycomb structural body by laser with pinpoint accuracy.

More specifically, the present invention provides the following film bonding machine.

[1] In a film bonding machine comprising a laser oscillation means for oscillating laser for processing a tape bonded onto an end surface of a columnar honeycomb structural body by the laser oscillated from the laser oscillation means, the film bonding machine further comprises an image pick-up means having a moving type or tilt type mirror capable of reflecting the end surface of the honeycomb structural body onto the same axis as the laser oscillation means by reflected light and an image pick-up unit for picking up the image of the end surface of the honeycomb structural body reflected on the mirror, wherein the processing position of the tape bonded onto the end surface of the honeycomb structural body can be recognized by the image-pick means on the same axis as the laser oscillation means.

[2] A film bonding machine according to [1] further comprises a honeycomb structural body moving means capable of gripping and moving the honeycomb structural body.

[3] A film bonding machine according to [1] or [2] further comprises a tape bonding means for bonding the tape onto the end surface of the honeycomb structural body.

[4] A film bonding machine according to [3], wherein bonding of the tape onto the end surface of the honeycomb structural body carried out by the tape bonding means, picking-up of the image of the end surface of the honeycomb structural body carried out by the image-pick means, and processing of the tape bonded onto the end surface of the honeycomb structural body carried out by the laser oscillated from the laser oscillation means can be continuously executed by gripping and moving the honeycomb structural body by the honeycomb structural body moving means.

[5] A film bonding machine according to any of [1] to [4], wherein the angle of view of the laser oscillation means is approximately the same as the angle of view of the image pick-up unit constituting the image-pick means.

[6] A film bonding machine according to any of [1] to [5] further comprises a correction means for correcting the distortion in the laser oscillation means and in the image pick-up unit constituting the image-pick means by segmenting the image obtained by the image pick-up unit.

[7] A film bonding machine according to any of [1] to [6], wherein the laser oscillation means is YAG laser, $CO_2$ laser, or UV laser.

[8] A film bonding machine according to any of [1] to [7], wherein the image pick-up unit is a CCD camera.

[9] A film bonding machine according to any of [3] to [8], wherein the tape bonding means bonds the band-shaped tape wound in a roll state onto the end surface of the honeycomb structural body while drawing out it by a predetermined amount.

[10] A film bonding machine according to any of [1] to [9], wherein the laser oscillation means cuts the tape bonded onto the end surface of the honeycomb structural body along the outer peripheral shape of the end surface thereof.

[11] A film bonding machine according to any of [1] to [9], wherein the laser oscillation means forms a through hole to the tape bonded onto the end surface of the honeycomb structural body at the predetermined position thereof.

Since the film bonding machine of the present invention includes the image-pick means having the mirror capable of reflecting the end surface of the honeycomb structural body by reflected light on the same axis as the laser oscillation means and the image pick-up unit for picking up the image of the end surface of the honeycomb structural body reflected by the mirror, the film bonding machine can recognize the processing position of the tape bonded onto the end surface of the honeycomb structural body by the image picked up by the image-pick means. Accordingly, processing, for example, cutting processing and hole forming processing of the tape bonded onto the end surface of the honeycomb structural body can be carried out by the laser oscillated from the laser oscillation means with pinpoint accuracy. Further, since the film bonding machine of the present invention can use a commercially available laser marker, for example, a galvanomirror scanning type laser marker and the like, the cost of the machine can be reduced.

REFERENCE NUMERALS

Figure 1A:
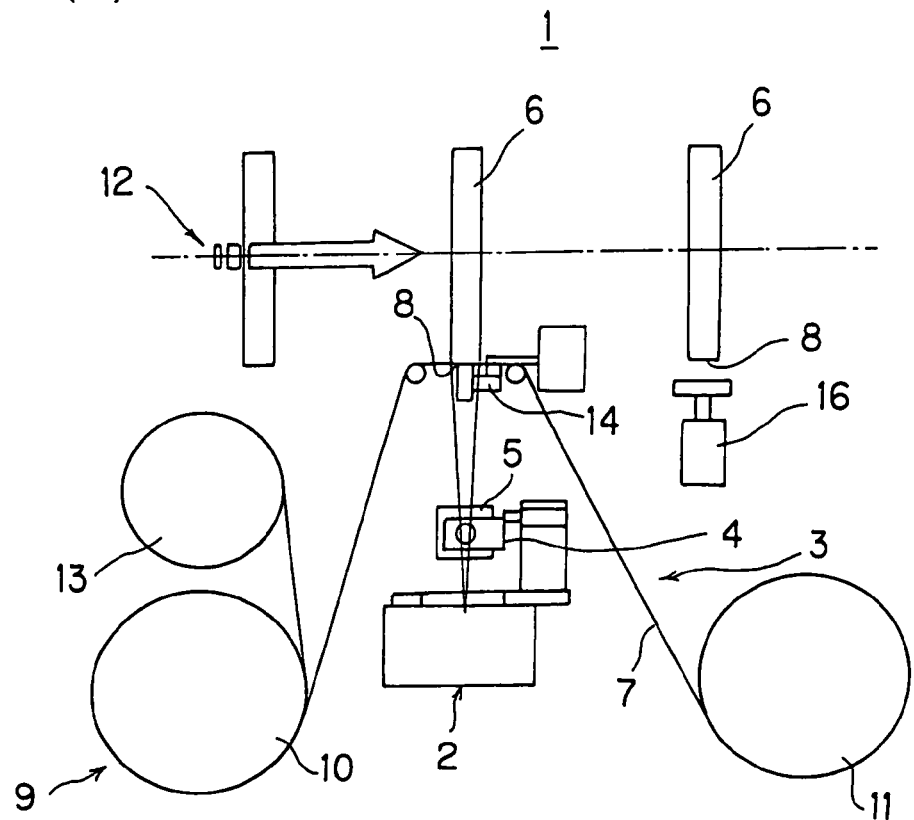
FIG. 1(a) is a front elevational view schematically showing an embodiment of a film bonding machine of the present invention.

1 ... film bonding machine, 2 ... laser oscillation means, 3 ... image-pick means, 4 ... mirror, 5 ... image pick-up unit, 6 ... honeycomb structural body, 7 ... tape, 8 ... end surface, 9 ... tape bonding means, 10 ... draw-out portion, 11 ... winding portion, 12 ... honeycomb structural body moving means, 13 ... separation paper draw-out unit, 14 ... press unit, 15 ... extra tape portion, 16 ... determining press means, 21 ... honeycomb structural body, 23 ... cell, 24 ... partition wall, 25 ... flow-in-hole side end surface, 26 ... flow-out-hole side end surface

BEST MODE FOR CARRYING OUT THE INVENTION

An embodiment of a film bonding machine of the present invention will be explained below in detail referring to the drawings. However, the present invention should not be interpreted so as to be limited to the above embodiment and can be variously changed, corrected, and modified based on the knowledge of the persons skilled in the art as long as it does not deviates from the scope of the present invention.

Figure 1B:
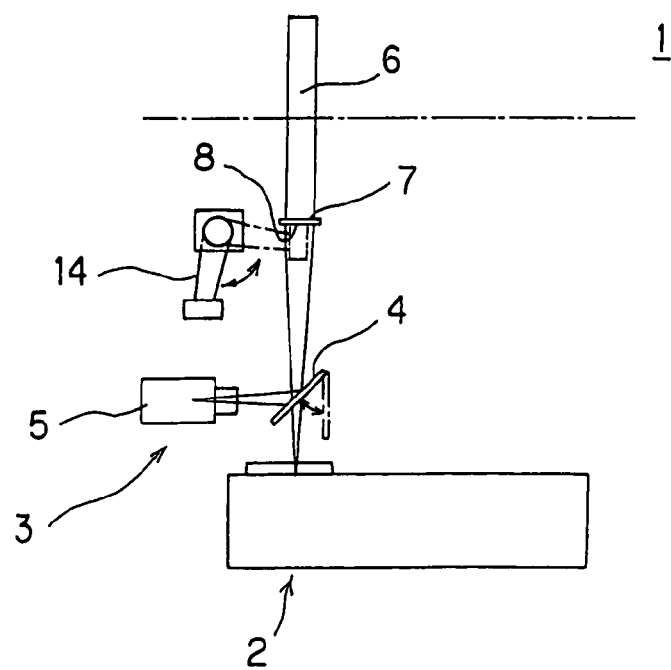
FIG. 1(b) is a side elevational view of the film bonding machine shown in FIG. 1(a).

FIG. 1(a) is a front elevational view schematically showing the embodiment of the film bonding machine of the present invention, and FIG. 1(b) is a side elevational view of the film bonding machine shown in FIG. 1(a). As shown in FIGS. 1(a), 1(b), the film bonding machine 1 of the present invention includes a laser oscillation means 2 for oscillating laser and processes a tape 7 bonded onto an end surface 8 of a columnar honeycomb structural body 6 by the laser oscillated from the laser oscillation means 2. The film bonding machine 1 further includes an image-pick means 3 having a moving type or inclining type mirror 4, which can reflect the end surface 8 of the honeycomb structural body 6 onto the same axis as the laser oscillation means 2 by reflected light, and an image pick-up unit 5 for picking up the image of the end surface 8 of the honeycomb structural body 6 reflected by the mirror 4. Accordingly, it is possible to recognize the processing position of the tape 7 bonded onto the end surface 8 of the honeycomb structural body 6 by the image-pick means 3 on the same axis as the laser oscillation means 2.

As described above, the film bonding machine 1 of the present invention subjects the tape 7 bonded onto the end surface 8 of the columnar honeycomb structural body 6 to cutting processing, hole forming processing, and the like carried out by the laser oscillated from the laser oscillation means 2. Since the film bonding machine 1 includes the image-pick means 3 having the mirror 4 and the image pick-up unit 5 as described above and the mirror 4 of the image-pick means 3 is arranged as the moving type or the inclining type, it can pick up the image of the end surface 8 of the honeycomb structural body 6 on the same axis as the laser oscillation means 2 and can carry out processings, for example, cutting processing and hole forming processing to the tape 7 bonded onto the end surface 8 of the honeycomb structural body 6 based on an obtained image with pinpoint accuracy. Accordingly, it is possible to reduce the extra portion (processing margin) of the tape 7 bonded onto the end surface 8 of the honeycomb structural body 6, so that the efficiency of use of the tape 7 can be improved.

Conventionally, a honeycomb structural body composed of a material such as SiC and the like is manufactured as a large integrated member by bonding the plural segments of quadratic-prism-shaped honeycomb structural bodies. At the time, a tape is bonded onto the end surface of each of the honeycomb structural bodies to prevent a bonding agent in use from flowing into the cell of the honeycomb structural body. The film bonding machine 1 of the embodiment can be used to cut the tape bonded onto the end surface of the quadratic-prism-shaped honeycomb structural body with pinpoint accuracy. Further, when a honeycomb structural body is used as a filter by sealing the openings of predetermined cells formed to the honeycomb structural body, a tape is bonded onto an end surface of the honeycomb structural body, through holes are formed to the predetermined positions of the bonded tape to fill the openings of the cells with a seal material, and the openings are sealed by filling them with the seal material from the through holes. The film bonding machine 1 of the embodiment can be also preferably used to form the through holes to the tape bonded onto the end surface of the honeycomb structural body as described above. Accordingly, it is preferable that the laser oscillation means 2 used to the film bonding machine 1 of the embodiment can cut the tape bonded onto the end surface 8 of the honeycomb structural body 6 along the outer peripheral shape of the end surface 8 and can form through holes at predetermined positions of the tape 7 bonded onto the end surface 8 of the honeycomb structural body 6.

In the film bonding machine 1 of the embodiment, the laser oscillation means 2 is disposed in a vertical direction with respect to the end surface 8 of the honeycomb structural body 6, and laser can be oscillated from the laser oscillation means 2 vertically to the end surface 8 of the honeycomb structural body 6.

Further, in FIGS. 1(a) and 1(b), the mirror 4 of the image-pick means 3 is tiltably adjustably interposed between the end surface 8 of the honeycomb structural body 6 and the laser oscillation means 2, and the image pick-up unit 5 of the image-pick means 3 is disposed at a position where it can take the image of the end surface 8 of the honeycomb structural body 6 reflected by the mirror 4 when the mirror 4 is tilted to a predetermined angle.

YAG laser, $CO_2$ laser, UV laser, or the like, for example, can be preferably used as the laser oscillation means 2 used in the film bonding machine 1 of the embodiment. When the size of the end surface of the honeycomb structural body is, for example, about 35 mm×35 mm, the tape 7 bonded onto the end surface can be cut along the outer peripheral shape of the end surface in about 0.5 to 1.0 second by the use of the laser oscillation means 2. Further, since a commercially available laser marker, for example, a galvanomirror scanning type laser marker and the like can be preferably used as the laser oscillation means 2, the cost of the film bonding machine 1 can be reduced.

It is preferable that the laser oscillation means 2 move in the vertical direction with respect to the end surface 8 of the honeycomb structural body 6 so that it can be finely adjusted when processing is carried out by laser.

Further, a CCD camera is preferably used as the image pick-up unit 5 constituting the image-pick means 3.

When the tape 7 bonded onto the end surface 8 of the honeycomb structural body 6 is processed using the film bonding machine 1 of the embodiment, first, the honeycomb structural body 6 having the tape 7 bonded onto the end surface 8 of it is set to the honeycomb structural body 6. Next, the mirror 4 of the image-pick means 3 is tilted to a predetermined angle so that it is located at a position where the image of the end surface 8 of the thus set honeycomb structural body 6 is reflected by the mirror 4 and can be picked up by the image pick-up unit 5, and the image of the end surface 8 reflected on the tilted mirror 4 is obtained by being picked up by the image pick-up unit 5. Next, the tilted mirror 4 is moved to a position where it does not interfere the laser oscillated from the laser oscillation means 2 as well as the tape 7 is processed by the laser oscillated from the laser oscillation means 2 while controlling the processing position of the tape 7 based on the image obtained by the image-pick means 3. With this arrangement, the laser oscillation means 2 and the image pick-up unit 5 of the image-pick means 3 are disposed on the same axis, so that processing can be carried out with pinpoint accuracy. For example, when image pick-up carried out by the image-pick means 3 and processing carried out by the laser oscillation means 2 are executed on different axes, the honeycomb structural body 6 must be moved after the image of the end surface 8 of it is picked up. In this case, accuracy in processing is deteriorated particularly when delicate processing is carried out. Further, in the film bonding machine 1 of the embodiment, since the laser oscillation means 2 and the image-pick means 3 are disposed on the same axis, the film bonding machine 1 is simplified, reduced in cost, and excellent in maintenability.

Further, although not illustrated, the mirror 4 used in the film bonding machine 1 of the embodiment may be of a moving type. When the mirror is arranged as the moving type, it is previously tilted to a position where it can reflect the end surface of the honeycomb structural body. Accordingly, image pick-up carried out by the image pick-up unit of the image-pick means and processing carried out by the laser oscillation means can be executed by simply moving the mirror 4.

It is preferable that the film bonding machine 1 of the embodiment further include a honeycomb structural body moving means 12 for gripping and moving the honeycomb structural body 6. Specifically, the honeycomb structural body moving means 12 grips the honeycomb structural body 6 before it is processed and moves it to a predetermined processing position, and then moves it to a different position after it is processed. Further, it is preferable that the honeycomb structural body moving means 12 continuously move plural honeycomb structural bodies 6. Provision of the honeycomb structural body moving means 12 arranged as described can realize continuous processing and reduce running cost.

Figure 2:
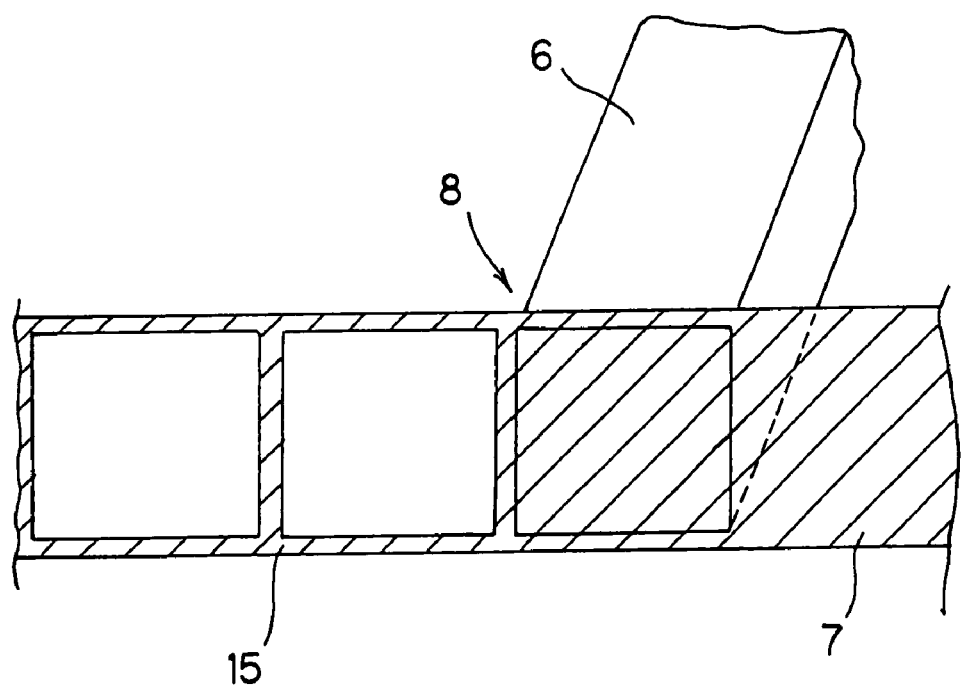
FIG. 2 is a plan view schematically showing a tape used in the embodiment of the film bonding machine of the present invention.
Figure 3A:
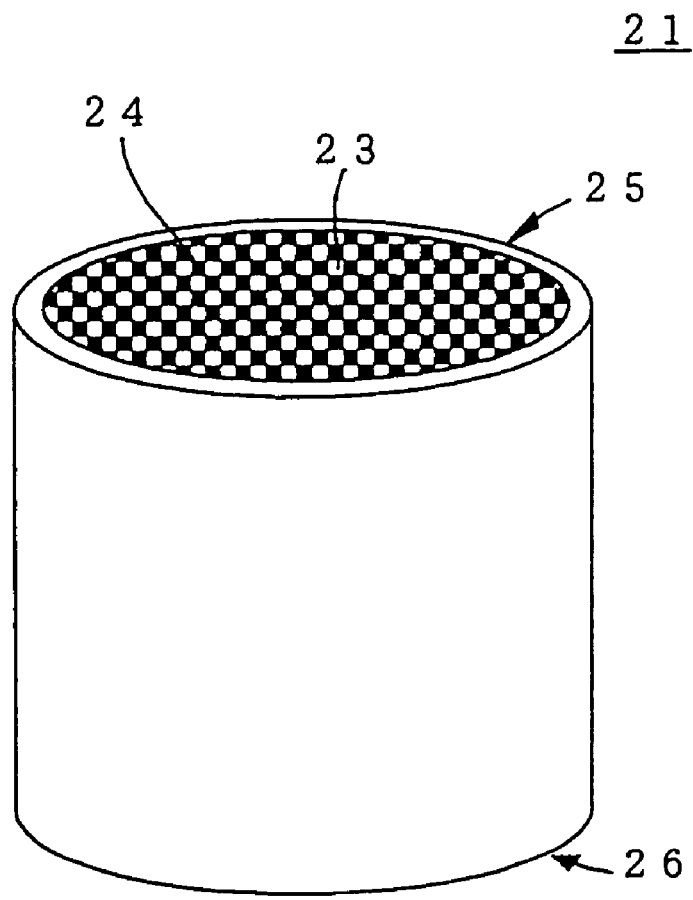
FIG. 3(a) is a perspective view explaining an ordinary honeycomb structural body.
Figure 3B:
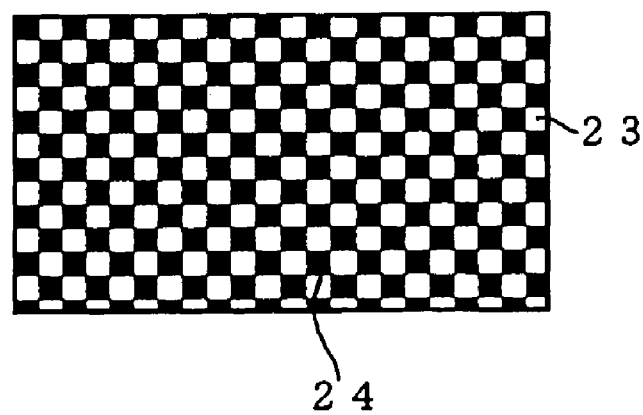
FIG. 3(b) is a partially enlarged plan view of an end surface of the honeycomb structural bodieshown in FIG. 3(a).

Further, the film bonding machine 1 of the embodiment may further include a tape bonding means 9 for bonding the tape 7 onto the end surface 8 of the honeycomb structural body 6. A tape bonding means for bonding a band-shaped tape 7 wound in a roll state onto the end surface 8 of the honeycomb structural body 6 while drawing out it by a predetermined amount can be preferably used as the tape bonding means 9. Specifically, as shown in, for example, FIG. 1, there is preferably exemplified the tape bonding means 9 including a draw-out portion 10 for drawing out the band-shaped tape 7 wound in the roll state in a predetermined amount and a winding portion 11 for winding the extra portion of the processed tape 7. With this arrangement, not only tapes can be continuously bonded onto plural honeycomb structural bodies 6 using the single band-shaped tape but also the extra portion 15 of the processed tape can be continuously wound as shown in FIG. 2. As a result, the extra tape portion 15 can be simply processed as well as the efficiency of use of the tape 7 can be improved by reducing the amount of extra tape portion 15 by bonding the tape 7 onto the end surface 8 of the honeycomb structural body 6 while drawing out it in the predetermined amount.

Although the tape 7 used in the film bonding machine 1 of the embodiment is not particularly limited, a transparent heat shrink tape, for example, can be preferably used. Further, as shown in FIG. 1(a), a tape having a bonding agent and a separation paper on the surface of it to be bonded can be preferably used. The tape bonding means 9 shown in FIG. 1(a) further includes a separation paper draw-out unit 13 for winding the separation paper 16 of the tape 7. Further, the tape bonding means 9 shown in FIG. 1(a) further includes a press unit 14 for improving an intimate contact property by pressing the tape 7 bonded onto the end surface 8 of the honeycomb structural body 6.

When the film bonding machine 1 of the embodiment further includes the honeycomb structural body moving means 12 and the tape bonding means 9 as described above, bonding of the tape 7 onto the end surface 8 of the honeycomb structural body 6 carried out by the tape bonding means 9, picking-up of the image of the end surface 8 of the honeycomb structural body 6 carried out by the image-pick means 3, and processing of the tape 7 bonded onto the end surface 8 of the honeycomb structural body 6 carried out by the laser oscillated from the laser oscillation means 2 are preferably executed continuously by gripping and moving the honeycomb structural body 6 by the honeycomb structural body moving means 12. With this arrangement, plural honeycomb structural bodies 6 can be continuously processed as well as a time necessary to process the tape 7 bonded onto the end surface 8 of one piece of the honeycomb structural body 6 can be reduced.

In the film bonding machine 1 of the embodiment, it is preferable that the angle of view of the laser oscillation means 2 be approximately the same as the angle of view of the image pick-up unit 5 constituting the image-pick means 3. With this arrangement, there can be reduced an adverse effect caused by a working distance, that is, by the change between the distance from the end surface 8 of the honeycomb structural body 6 to the extreme end portion of a lens of the laser oscillation means 2 for oscillating laser and the distance from the end surface 8 of the honeycomb structural body 6 to the extreme end portion of a lens of the image pick-up unit 5 for picking up the image of the end surface 8 of the honeycomb structural body 6, so that processing can be more accurately carried out.

It is preferable that the film bonding machine 1 of the embodiment further include a correction means for correcting the distortion in the laser oscillation means 2 and in the image pick-up unit 5 constituting the image-pick means 3 by segmenting the image obtained by the image pick-up unit 5. An image processing device, which can recognize the information obtained from the image pick-up unit 5, for example, the CCD camera and the like as a coordinate, can be exemplified as the correction means.

As shown in FIG. 1, the film bonding machine 1 of the embodiment may further include a determining press means 16 for further improving the intimate contact property of the processed tape 7 to the end surface 8 of the honeycomb structural body 6. It is preferable that the determining press means 16 have a plate-shaped member for pressing the end surface 8 of the honeycomb structural body 6 together with the processed tape 7.

EXAMPLES

Although the present invention will be explained below more specifically with reference to examples, the present invention is by no means limited to them.

Example 1

A film bonding machine 1 as shown in FIG. 1 was manufactured which included a laser oscillation means 2 for oscillating laser and an image-pick means 3 having a tilt-type mirror 4 capable of reflecting an end surface 8 of a cylindrical honeycomb structural body 6 on the same axis as the laser oscillation means 2 by reflected light and an image pick-up unit 5 for picking up the image of the end surface 8 of the honeycomb structural body 6 reflected by the mirror 4. Note that the film bonding machine 1 of the example further included a honeycomb structural body moving means 12 capable of griping and moving the honeycomb structural body 6 and a tape bonding means 9 for bonding a tape onto the end surface 8 of the honeycomb structural body 6.

A commercially available galvanomirror scanning type $CO_2$ laser was used as the laser oscillation means 2, and a CCD camera was used as the image pick-up unit 5 of the image-pick means 3. The honeycomb structural body 6 was mainly composed of silicon carbide (SiC) and had an end surface whose size was set to 35 mm×35 mm. A transparent band-shaped heat shrink tape wound in a roll state was used as the tape 7 to be bonded onto the end surface 8 of the honeycomb structural body 6.

Processing was continuously carried out to bond the tape 7 onto the end surface 8 of one piece of the honeycomb structural body 6 and cutting the tape 7 along the outer peripheral shape of the end surface 8 by laser. The processing could be carried out in about 5.8 seconds per one piece of the honeycomb structural body 6. Further, the ratio of the sum of the surface areas of the tape 7 which was cut along the outer peripheral shape of the end surfaces 8 of respective honeycomb structural bodies 6 (the value of the sum of the surface areas of the tape 7 excluding the tape discarded as an extra portion) to the overall surface area of the used tape 7 was 55% (hereinafter, the ration is called an "efficiency of use of tape").

Comparative Example 1

Processing was carried out to bond a tape onto the end surface of a honeycomb structural bodiesimilar to that used in the example 1 by hand and to cut the tape along the outer peripheral shape of the end surface of the honeycomb structural body. In the comparative example, about 120 seconds were necessary to process one piece of the honeycomb structural body.

Comparative Example 2

A film bonding machine having a laser oscillation means for oscillating laser and a CCD camera for picking up the image of an end surface of a cylindrical honeycomb structural body on an axis different from the laser oscillation means was manufactured. Processing was carried out using the film bonding machine to bond a tape onto the end surface of the honeycomb structural body using the film bonding machine, to pick up the image of the end surface using the CCD camera, to move the honeycomb structural body, and to cut the tape bonded onto the end surface of the honeycomb structural body along the outer peripheral shape of the end surface on an axis different from the CCD camera by the laser oscillated by the laser oscillation means 2. In the comparative example 2, a set of four pieces of the honeycomb structural bodies was processed in one cycle, and 16 seconds were necessary to carry out processing of the one cycle. In the processing, the extra portion of the tape was made larger than necessary, and the efficiency of use of tape was 33%.

INDUSTRIAL APPLICABILITY

The film bonding machine of the present invention can carry out processing such as cutting, forming of holes, and the like to a tape bonded onto an end surface of a honeycomb structural body. Accordingly, when the plural segments of a quadratic-prism-shaped honeycomb structural body are bonded to each other, the film bonding machine can be preferably used to process a tape to be bonded to prevent a bonding agent in use from flowing into the cells of the honeycomb structural body (segments). Further, the film bonding machine can be also preferably used to process a tape used to seal the openings of the cells of the honeycomb structural body.

The invention claimed is:

1. A film bonding machine comprising:
   a honeycomb structural body mover capable of gripping and moving a honeycomb structural body to an intended location;
   a tape bonder that bonds a continuous tape onto an end surface of the honeycomb structural body;
   a laser oscillator that oscillates a laser so as to perform cutting processing of the tape bonded onto the end surface of the honeycomb structural body to obtain the honeycomb structural body wherein the tape having a predetermined size along an outer peripheral shape is bonded on the end surface;
   a moving type or tilt type mirror located in a position capable of reflecting a light reflected from the tape bonded to the end surface of the honeycomb structural body on the same axis as the laser oscillated from the laser oscillator and capable of being moved from the position on the same axis when the laser oscillates;
   an image pick-up unit that picks up an image of the end surface of the honeycomb structural body reflected by the mirror;
   a processing position controller that positions the laser from the laser oscillator so as to cut the bonded tape into an intended shape based on the picked image; and
   a pair of rollers that contact the tape upstream of the honeycomb structural body and contact a residual portion of the tape downstream of the honeycomb structural body, respectively, the residual portion of the tape being created after the tape is cut by the laser oscillator,
   wherein the tape bonder includes a winding element for winding the residual portion of the tape.

2. A film bonding machine according to claim 1, wherein bonding of the tape onto the end surface of the honeycomb structural body carried out by the tape bonder, picking-up of the image of the end surface of the honeycomb structural body carried out by the image pick-up device, and processing of the tape bonded onto the end surface of the honeycomb structural body carried out by the laser oscillated from the laser oscillator can be continuously executed by gripping and moving the honeycomb structural body by the honeycomb structural bodymover.

3. A film bonding machine according to claim 1, wherein from the end surface of the honeycomb structural body, when viewing the image reflected on the mirror, an angle of view of the laser oscillator is approximately the same as the angle of view of the image pick-up unit constituting the image-pick unit, the angle of view being an angle between a line of sight from the laser oscillation unit or the image pickup unit and a plane that is substantially parallel to a surface of the mirror.

4. A film bonding machine according to claim 1, further comprising a correction device that corrects distortion in the laser oscillator and in the image pick-up unit by segmenting the image obtained by the image pick-up unit.

5. A film bonding machine according to claim 1, wherein the laser oscillator is YAG laser, $CO_2$ laser, or UV laser.

6. A film bonding machine according to claim 1, wherein the image pick-up unit is a CCD camera.

7. A film bonding machine according to claim 1, wherein the tape bonder bonds a band-shaped tape wound in a roll state onto the end surface of the honeycomb structural body while drawing out the tape by a predetermined amount.

8. A film bonding machine according to claim 1, wherein the laser oscillator forms a through hole to the tape bonded onto the end surface of the honeycomb structural body at a predetermined position thereof.

9. A film bonding machine according to claim 1, further comprising a draw-out portion configured to supply the tape to the tape bonder.

10. A film bonding machine according to claim 1, further comprising a separation paper draw-out unit configured to remove a separation paper from the tape before the tape is received by the tape bonder.

11. A film bonding machine accroding to claim 1, wherein the tape bonder includes a press unit configured to press the tape onto the end surface of the honeycomb structural body, the press unit having a swing arm structure that is configured to pivotably move a portion of the press unit from a first position to a second position.

* * * * *